(12) United States Patent
Nielsen et al.

(10) Patent No.: US 7,955,742 B2
(45) Date of Patent: Jun. 7, 2011

(54) FUEL CELL HOUSING AND FUEL CELL ASSEMBLIES

(75) Inventors: Peter Nielsen, Fredericia (DK); Klaus Moth, Kolding (DK); Ulrik Karlsson, Fredericia (DK)

(73) Assignee: American Power Conversion Corporation, West Kingston, RI (US)

( * ) Notice: Subject to any disclaimer, the term of this patent is extended or adjusted under 35 U.S.C. 154(b) by 423 days.

(21) Appl. No.: 10/900,989

(22) Filed: Jul. 28, 2004

(65) Prior Publication Data

US 2006/0024544 A1   Feb. 2, 2006

(51) Int. Cl.
H01M 8/06 (2006.01)
H01M 8/04 (2006.01)
H01M 2/38 (2006.01)
H01M 2/40 (2006.01)
H01M 8/24 (2006.01)

(52) U.S. Cl. ........ 429/414; 429/408; 429/409; 429/413; 429/450; 429/456; 429/512

(58) Field of Classification Search ............ 429/17, 429/26, 34, 14, 408, 409, 413, 414, 450, 429/456, 512
See application file for complete search history.

(56) References Cited

U.S. PATENT DOCUMENTS

| | | | |
|---|---|---|---|
| 4,002,493 A | | 1/1977 | Warszawski |
| 4,826,741 A | | 5/1989 | Aldhart et al. |
| 5,856,034 A | * | 1/1999 | Huppmann et al. ............ 429/17 |
| 6,582,843 B1 | | 6/2003 | Heuser |
| 6,821,662 B1 | * | 11/2004 | Charlat et al. ............... 429/17 |
| 2002/0076599 A1 | * | 6/2002 | Neutzler et al. ............... 429/38 |

FOREIGN PATENT DOCUMENTS

| | | | |
|---|---|---|---|
| JP | 62229768 A | | 10/1987 |
| JP | 05151980 A | * | 6/1993 |
| JP | 05283094 A | | 10/1993 |
| JP | 2000260456 A | | 9/2000 |
| WO | WO0241427 A1 | * | 5/2002 |

OTHER PUBLICATIONS

Updated Translation for JP 2000-260456 (relied on in previous actions).*
Machine Translation of JP 05151980 A, relied upon for rejection.*
Examination Report; EP Application No. 05803343.2-1227; Apr. 3, 2008.

* cited by examiner

*Primary Examiner* — Gregg Cantelmo
*Assistant Examiner* — Eugenia Wang
(74) *Attorney, Agent, or Firm* — Lando & Anastasi, LLP

(57) ABSTRACT

A fuel cell housing comprising at least one surface configured to condense fluid from exhaust air passing over or through the surface and configured to return the condensed fluid to electrolyte of a fuel cell or fuel cell stack within the fuel cell housing is disclosed. Fuel cell assemblies comprising the fuel cell housing are also disclosed.

31 Claims, 6 Drawing Sheets

FUEL CELL HOUSING AND FUEL CELL ASSEMBLIES

FIELD OF THE TECHNOLOGY

Certain examples relate to a fuel cell housing. More particularly, certain examples relate to a fuel cell housing configured with at least one surface to condense fluid in exhaust.

BACKGROUND

Certain fuel cells contain an electrolyte that uses a fluid-based electrolyte for proper operation. For example, proton exchange membrane (PEM) fuel cells and direct methanol fuel cells include a membrane that uses water for proper operation. Water allows for transport of protons from the anode through the membrane and to the cathode. To maintain the water balance in some fuel cells having electrolytes that are hydrated, water may be added to the fuel cell and/or output air from the fuel cell may be passed through an external condenser where heat is dissipated and water is condensed. The use of condensers provides added expense as separate external devices must be configured to receive and condense the output air. The condenser also is typically configured with a pump to return the condensed water to the fuel cell. There is a need for simpler, cost-effective devices to maintain fluid levels in electrolytes of fuel cells.

SUMMARY

Certain aspects and examples disclosed herein provide a fuel cell housing that is configured to condense fluid from exhaust. In certain particular aspects and examples a fuel cell housing includes at least one surface configured to condense fluid from exhaust air and return the condensed fluid to electrolyte of a fuel cell or fuel cell stack in the fuel cell housing.

In accordance with a first aspect, a fuel cell housing comprising at least one surface configured to condense fluid from exhaust passing over or through the surface is provided. In certain examples, the surface can be further configured to return the condensed fluid to a fuel cell or fuel cell stack within the fuel cell housing. In some examples, the exhaust can be passed through an exhaust manifold which can be in thermal communication with at least some portion of a surface of the fuel cell housing that is configured to condense fluid in the exhaust. By using examples of the fuel cell housing disclosed herein, an external condenser may be omitted while still maintaining a substantially constant electrolyte fluid level in the fuel cell or fuel cell stack. However, as discussed in more detail below, certain examples may also be used with an external condenser.

In accordance with an additional aspect, a fuel cell assembly is provided. The fuel cell assembly includes a fuel cell housing configured to provide a surface for condensation of fluid in exhaust. A fuel cell or fuel cell stack can be positioned within the fuel cell housing. In examples employing a fuel cell stack, the fuel cell stack includes a plurality of fuel cells, wherein each of the fuel cells comprises an anode, a cathode, and an electrolyte between the anode and the cathode. The fuel cell assembly may also include a fuel source in fluid communication with the anode, and an air source in fluid communication with the cathode. The fuel source and/or air source can be positioned in the fuel cell housing or can be located external to the fuel cell housing. The fuel cell housing can be configured to condense fluid out of exhaust and return the fluid to electrolyte or the fuel cell or fuel cell stack.

In accordance with a method aspect, a method of maintaining substantially constant electrolyte fluid levels is disclosed. The method includes condensing fluid from exhaust using a fuel cell housing and returning the condensed fluid to electrolyte of a fuel cell in the fuel cell housing. In some examples, the fluid is water which can be condensed from exhaust and returned back to the electrolyte of the fuel cell or fuel cell stack.

It will be recognized by the person of ordinary skill in the art, given the benefit of this disclosure, that the fuel cell housings and fuel cell assemblies disclosed herein provide effective and simpler fuel cell housings and fuel cell assemblies than those previously described. Fuel cell housings can be designed to maintain substantially constant electrolyte fluid levels to provide more efficient and more reliable fuel cell assemblies.

BRIEF DESCRIPTION OF THE DRAWINGS

Certain illustrative examples are described below with reference to the accompanying drawings in which.

Certain features or components of the illustrative fuel cell housings and fuel cell assemblies shown in the figures may have been enlarged or distorted relative to other features or components to facilitate a better understanding of the novel devices and methods disclosed here. It will be recognized by the person of ordinary skill in the art, given the benefit of this disclosure, that the fuel cell housings and fuel cell assemblies disclosed here, and methods of their use, can be used in any orientation relative to gravity and suitable orientations will be selected by the person of ordinary skill in the art, given the benefit of this disclosure.

DETAILED DESCRIPTION OF CERTAIN EXAMPLES

The fuel cell housings and fuel cell assemblies disclosed herein will be recognized by the person of ordinary skill in the art, given the benefit of this disclosure, to provide cost-effective and simpler fuel cell housings and fuel cell assemblies that can maintain electrolyte fluid levels in a fuel cell or fuel cell stack.

As used herein, the term "fluid" is used in the broad sense and encompasses liquids, gases, supercritical fluids and the like. "Substantially constant electrolyte fluid level" refers to maintaining the fluid level of the electrolyte by at least about 99%, more particularly by at least about 95%, e.g., during operation of the fuel cell or fuel cell stack the fluid level in the electrolyte is at least about 90% of the fluid level present prior to starting the fuel cell or the fuel cell stack. In examples where the fluid in the electrolyte is water, the degree of humidification of the electrolyte is at least about 90%, more particularly at least about 95%, e.g., about 100%.

Figure 1:
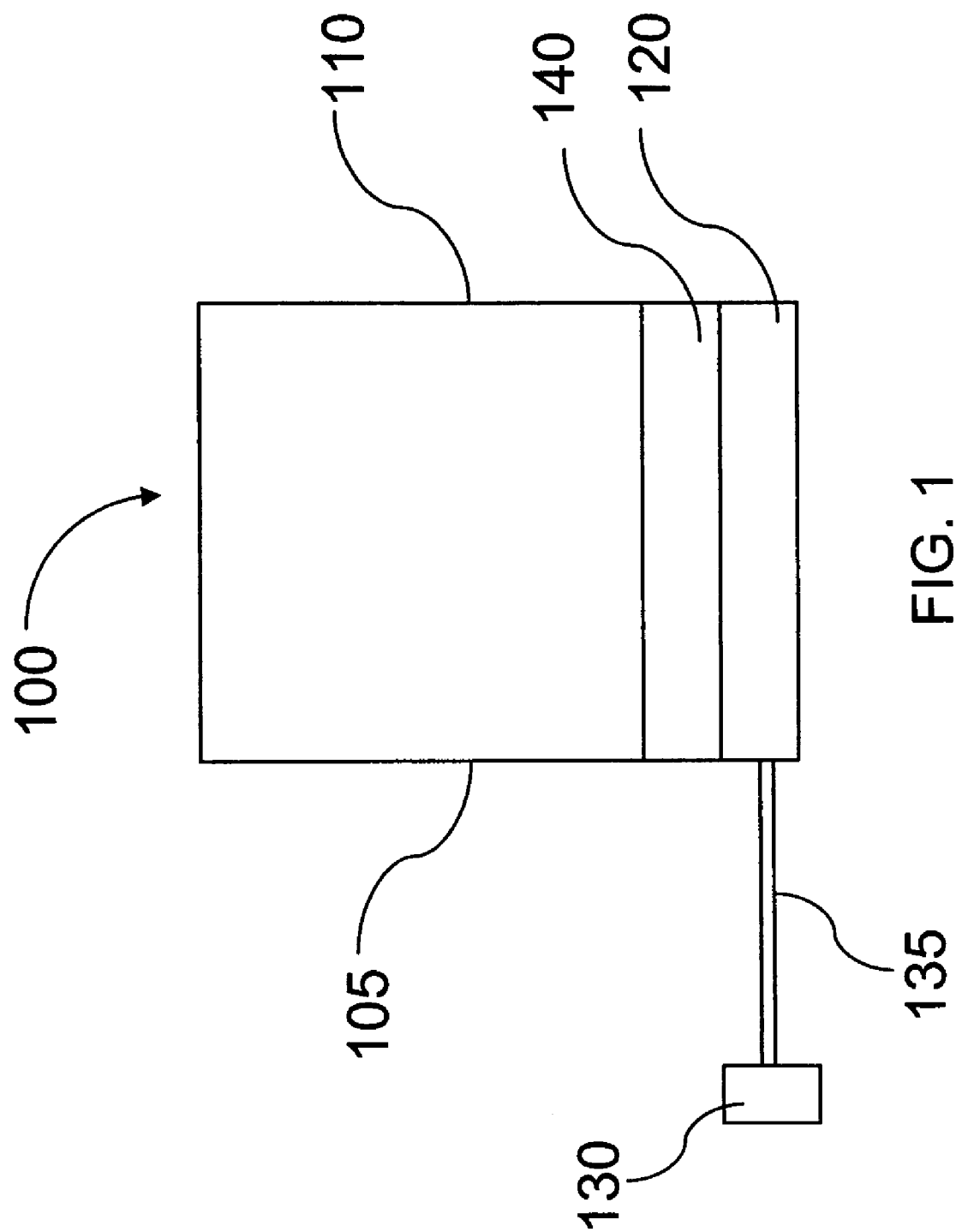
FIG. 1 is a first example of a fuel cell housing, in accordance with certain examples.

In accordance with certain examples, a fuel cell housing comprising at least one surface configured to condense fluid from exhaust passing over or through the surface is provided. The exact configuration of the surface can vary depending on the type of fuel cell, operating temperature, etc. Referring to FIG. 1, fuel cell housing 100 may include one or more cooling surfaces, such as cooling surfaces 105 and 110. In this example, the one or more cooling surfaces are shown along the sidewalls of fuel cell housing 100. In other examples, the cooling surface can be along the top or bottom of the fuel cell housing or can be located on a device within the fuel cell housing. In yet other examples, the cooling surface can be a surface of a fluid conduit that provides air or fuel to a fuel cell or fuel cell stack. Without wishing to be bound by any particular scientific theory, as exhaust air is passed over a cooling surface, fluid in the exhaust can condense if the temperature of the cooling surface is less than the vaporization temperature of the fluid. For example, where the exhaust air includes water vapor to be condensed, a cooling surface having a temperature less than about 100° C., more particularly less than or equal to about 80° C., e.g., less than or equal to about 60° C., 50° C., or 40° C., will allow for water vapor to condense to liquid water. In certain examples, the liquid water settles or pools at the bottom of fuel cell housing 100, where it may be stored in fuel reservoir 120. For example, in certain applications an aqueous solution of a fuel, such as methanol, is used. The condensed water can be routed for storage in the aqueous solution of fuel. To keep the ratio of fuel/water substantially the same, a source of fuel may be in fluid communication with fuel source tank 120, e.g., a fuel source 130 in fluid communication with fuel source tank 120 through a fluid conduit 135. In some examples, exhaust is at a temperature of about 70° C. and has a relative humidity of about 100%. By using the devices disclosed herein, water can be removed from the exhaust stream and returned to liquid form.

In accordance with certain examples, only a portion of the exhaust outputted by the fuel cell or fuel cell stack may be condensed. For example, in certain applications it may be unnecessary to condense fluid from all exhaust to maintain electrolyte fluid levels. In such situations, a portion of the exhaust can be routed to a cooling surface, and the residual amount of exhaust can be exhausted out of the fuel cell housing and into the surrounding environment. It will be within the ability of the person of ordinary skill in the art, to select suitable amounts of exhaust to be routed to cooling surfaces for condensing fluid from the exhaust. In certain examples, to control the amount of exhaust that is routed to a cooling surface, an exhaust outlet includes one or more controllable valves to route the exhaust to a cooling surface or out of the fuel cell housing. In certain other examples, a pressure-actuated valve may be used such that if exhaust air pressure builds up, the valve can open to route exhaust air to a suitable location, e.g., either to a cooling surface or to outside the fuel cell housing, to prevent unwanted high pressure build-up in the fuel cell housing. In some examples, a percentage of the exhaust is exhausted to the surrounding environment, e.g., through a fan, during operation of a fuel cell or fuel cell stack. The percentage of air exhausted to the surrounding environment can be controlled by controlling the speed of the fan. In situations where it is desirable to condense additional fluid within the fuel cell housing, the speed of the fan can be reduced to retain additional exhaust within the fuel cell housing. The person of ordinary skill in the art, given the benefit of this disclosure, will be able to select suitable amounts of air to exhaust and/or retain in the fuel cell housing to provide a desired level of fluid condensation in the fuel cell housing.

In accordance with certain examples, exhaust can be passed through a reformer or through a membrane to remove any unused fuel from the exhaust prior to exiting of exhaust from the fuel cell housing. Without wishing to be bound by any particular scientific theory, removal of unused fuel from the exhaust prevents fuel from escaping into the atmosphere and can return fuel to the fuel source to provide more efficient operating fuel cell assemblies. Exemplary reformers include, but are not limited to, in-line devices configured to burn excess fuel in the exhaust. Exemplary membranes for removing unused fuel from exhaust include, but are not limited to polymeric membranes, cellulose based membranes, membranes with bound or trapped metals to chelate excess fuel, hydrophobic membranes and the like. It will be within the ability of the person of ordinary skill in the art, given the benefit of this disclosure, to select suitable devices and methods to remove unused fuel from the exhaust.

In certain other examples, the condensed fluid can be provided to a fluid reservoir, such as a fluid reservoir 140 shown in FIG. 1. The exact configuration of the fluid reservoir can vary depending on the type of fuel cell, operating temperatures, etc., but in certain examples the fluid reservoir includes at least one fluid permeable surface to allow condensed fluid inside the fuel cell housing to enter the fluid reservoir. Permeability of the fluid reservoir can be achieved using numerous suitable configurations, such as holes in an upper surface of the fluid reservoir, fluid permeable membranes, wicking materials and the like. The person of ordinary skill in the art, given the benefit of this disclosure, will be able to select suitable devices for routing condensed fluid to fluid reservoirs.

Figure 2:
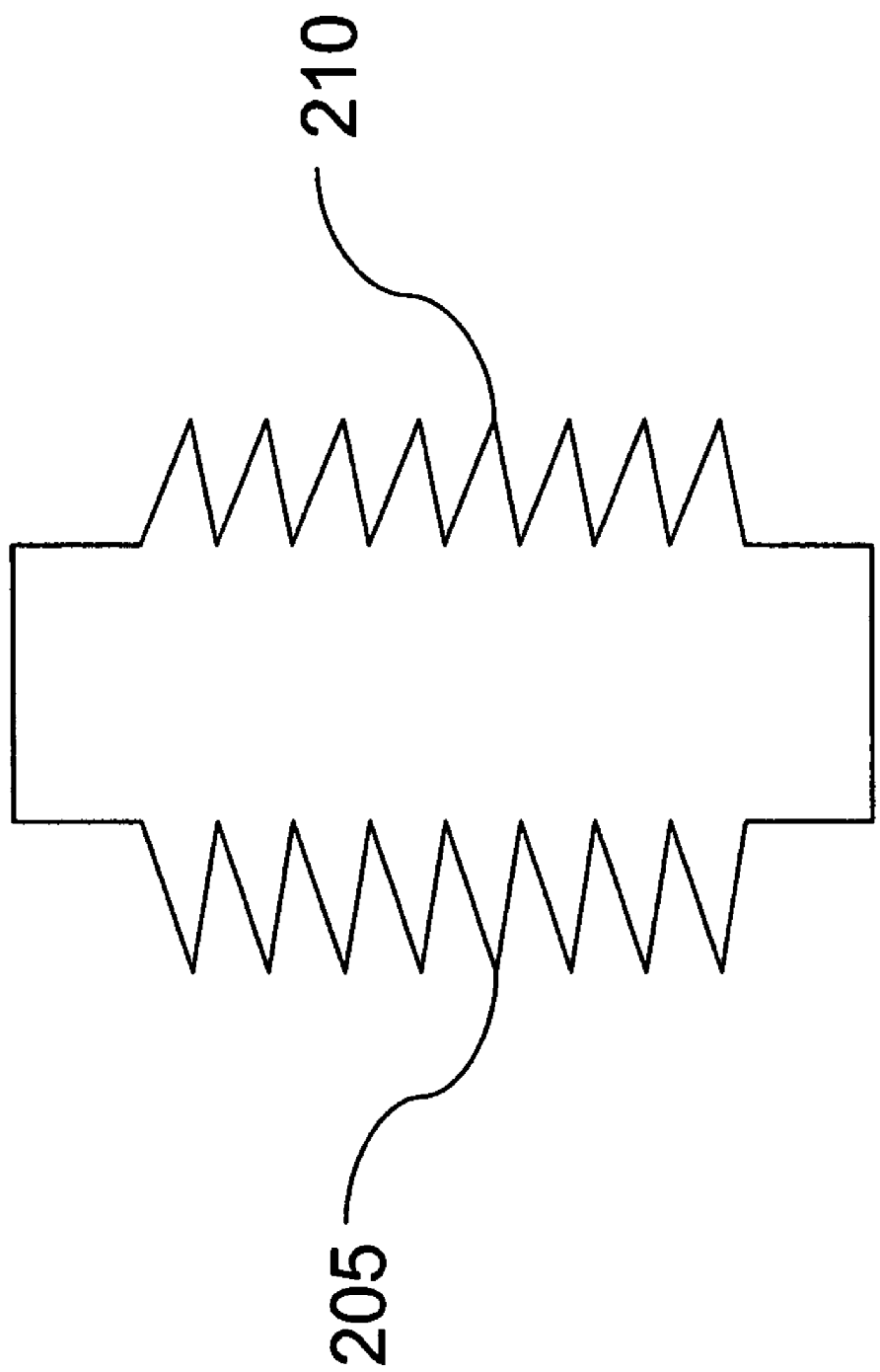
FIG. 2 is another example of a fuel cell housing, in accordance with certain examples.

In accordance with certain examples, the fuel cell housing may include fins or projections to provide additional cooling surfaces for condensation of fluid. Referring to FIG. 2, fins 205 and 210 can be disposed along one or more surfaces of the fuel cell housing to provide additional surface area for condensing fluid. In certain examples, exhaust air is passed through the fins, which can be at a substantially lower temperature than the operating temperature of a fuel cell or fuel cell stack within the fuel cell housing. The fins may be positioned along an outer surface of a fuel cell housing, as shown in FIG. 2, or can be positioned along an inner surface of a fuel cell housing. The fins or projections may be in fluid communication with each other so that exhaust air can pass from one fin to an adjacent fin. The exact number of fins can vary depending on the desired length or area of cooling surface. It will be within the ability of the person of ordinary skill in the art, given the benefit of this disclosure, to design fuel cell housings with a suitable number of fins.

In accordance with certain examples, the materials used to construct the fuel cell housing can vary. In some examples, one or more walls of the fuel cell housing can include a material having a higher heat capacity or a higher heat transfer coefficient than the materials on the other walls. The wall with the higher heat capacity material or material with a higher heat transfer coefficient can resist heating to a higher degree than the other walls of the fuel cell housing so that the temperature of wall with the higher heat capacity material or material with a higher heat transfer coefficient is lower than the temperature of the other walls. Suitable materials with high heat capacities and high heat transfer coefficients include, but are not limited to, ceramics, copper, gold, and the like. In certain examples, a high heat capacity material refers to a materials having a heat capacity of at least about 30 cal/deg-mol, more particularly at least about 50 cal/deg-mol, at 298.15 K and 1 atmosphere of pressure. In certain other examples, a material with a high heat transfer coefficient refers to a material having a heat transfer coefficient of at least about 100 W/m$^2$-K, more particularly at least about 200 W/m$^2$-K. Other suitable materials for providing one or more cooling surfaces for a fuel cell housing will be readily selected by the person of ordinary skill in the art, given the benefit of this disclosure. In certain examples, each of the walls of the fuel cell housing is constructed from the same material and one or more additional materials may be disposed on one or more walls to provide a cooling surface. Suitable techniques for disposing materials include, but are not limited to, vapor deposition, chemical deposition, molecular beam epitaxy, sputtering, spin-coating, brushing, rolling, spraying and other coating techniques that the person of ordinary skill in the art will readily recognize, given the benefit of this disclosure.

Figure 3:
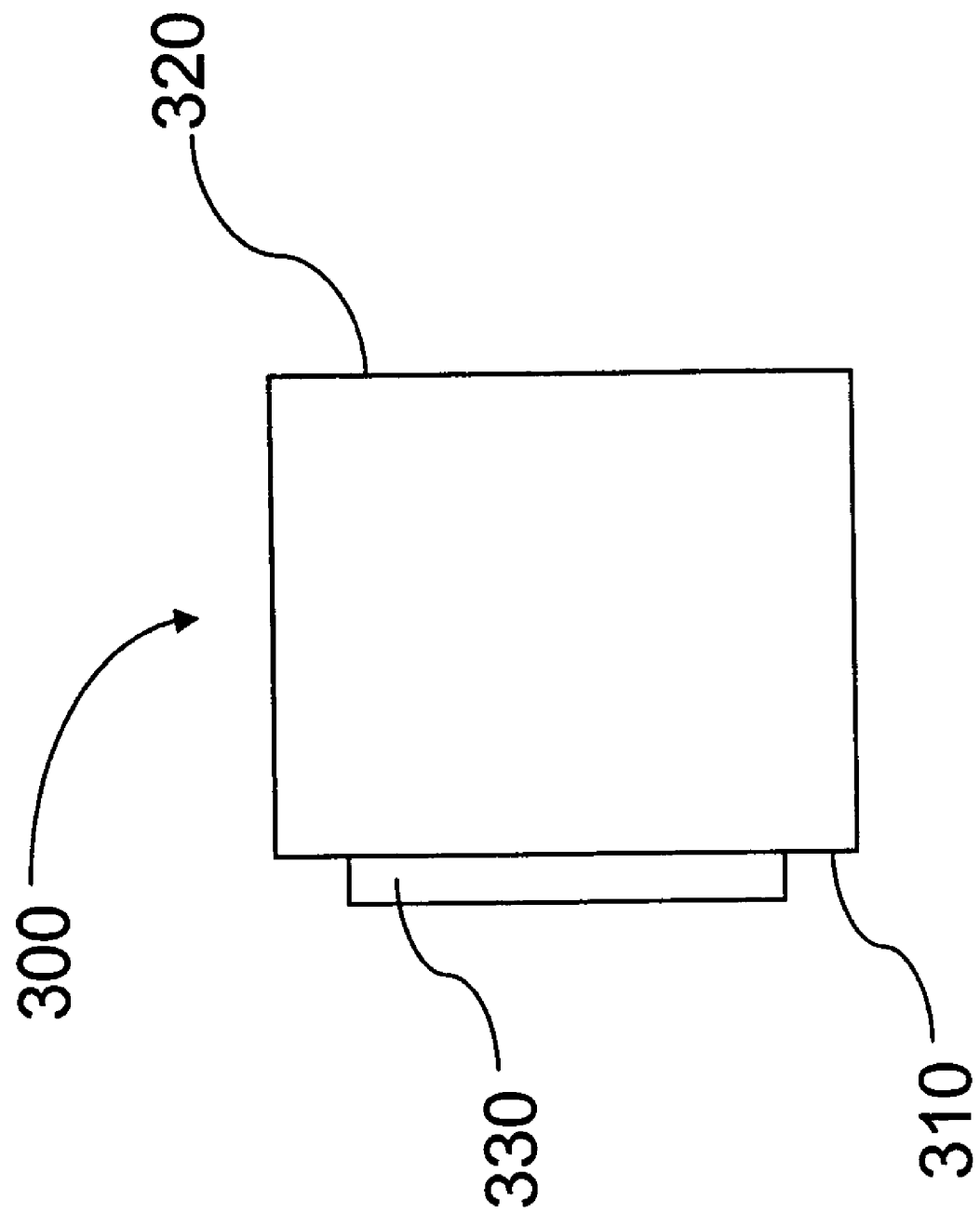
FIG. 3 is yet another example of a fuel cell housing, in accordance with certain examples.

In accordance with certain examples, a surface of the fuel cell housing that is to act as a cooling surface may include a fan or cooler. For example, referring to FIG. 3, a fuel cell housing 300 includes sidewalls 310 and 320. Sidewall 310 includes cooling device 330 which is located external to fuel cell housing 300 and configured to be in thermal communication with sidewall 310 to absorb and/or to remove heat from sidewall 310 to reduce the temperature of sidewall 310. The reduction in temperature of sidewall 310 allows for condensation of fluid from exhaust passing over sidewall 310. Cooling device 330 may take numerous forms, and in certain examples, cooling device 330 is a heat sink, a fan, a blower, a thermoelectric cooler such as a Peltier cooler, a heat pump and other devices that are operative to transfer or absorb heat. In some examples, two or more cooling devices can be used. In certain other examples, the cooling device or cooling devices can be positioned within the fuel cell housing. The person of ordinary skill in the art, given the benefit of this disclosure, will be able to design suitable fuel cell housings that include one or more cooling devices.

In accordance with certain examples, fuel cell assemblies that include the fuel cell housing disclosed herein do not require an external condenser. However, in certain applications, e.g., applications requiring almost constant levels or high levels of electrolyte fluid, it may be desirable to include an external condenser to assist the cooling surfaces of the fuel cell housing in providing condensed fluid to the electrolyte. The external condenser may be in fluid communication with a fluid reservoir, with the fuel source or air source, and/or with the fuel cell or fuel cell stack. Suitable condensers for use with a fuel cell or fuel cell stack include, but are not limited to, those commercially available from Flex coil (Denmark), Britannia Heated (UK), Alfa Laval (Sweden), and APV (Denmark).

In accordance with certain examples, the fuel cell housing may include a manifold, e.g., an exhaust manifold that receives the exhaust from a fuel cell or a fuel cell stack. The manifold can be configured such that the temperature of at least some portion of the manifold is less than the operating temperature of the fuel cell or fuel cell stack, and, more particularly, the temperature of at least some portion of the manifold is less than the vaporization temperature of the fluid to be condensed. The manifold may take numerous configurations and can be coiled to increase the length of the manifold to provide more surface area for condensation of fluid. One end of the manifold may be in fluid communication with a fuel cell or fuel cell stack to receive exhaust from the fuel cell or fuel cell stack. Another end of the manifold may be in fluid communication with a fluid reservoir or with a fuel source or fuel reservoir, such as an aqueous direct methanol fuel reservoir. In certain examples, one or more portions of the manifold may include a material having a high heat capacity, such as those discussed above, for example, to cool that area of the manifold. In certain other examples, one or more portions of the manifold may include a cooling device, such as those discussed herein, to decrease the temperature of that portion of the manifold. It will be within the ability of the person of ordinary skill in the art, given the benefit of this disclosure, to design suitable manifolds for use in the fuel cell housings and fuel cell assemblies disclosed herein.

In accordance with certain examples, a fluid conduit within the fuel cell housing that provides fluid communication between a air source and a fuel cell or fuel cell stack can be used to provide a cooling surface for condensation of fluid. For example, the temperature of a fluid conduit that provides fluid communication between an air source and a fuel cell or fuel cell stack can be substantially less than the operating temperature of the fuel cell or fuel cell stack. In examples where the temperature of the fluid conduit is less than the vaporization temperature of fluid in exhaust, fluid can be condensed on a surface of the fluid conduit. In some examples, an outer surface of the fluid conduit may include a coating of one or more materials with a high heat capacity, or in certain examples, at least some portion of the fluid conduit is constructed from a material with a high heat capacity. Fluid that condenses on the surface of the fluid conduit can be routed to a fluid reservoir, can be routed to a fuel reservoir, can be returned to electrolyte of a fuel cell, etc. It will be within the ability of the person of ordinary skill in the art, given the benefit of this disclosure, to configure fluid conduits that provide fluid communication between an air source and a fuel cell and that are configured to condense fluid on one or more surfaces.

In accordance with certain examples, a fluid conduit within the fuel cell housing that provides fluid communication between a fuel source and a fuel cell or fuel cell stack can be used to provide a cooling surface for condensation of fluid. For example, the temperature of a fluid conduit that provides fluid communication between a fuel source and a fuel cell or fuel cell stack can be substantially less than the operating temperature of the fuel cell or fuel cell stack. In examples, where the temperature of the fluid conduit is less than the vaporization temperature of fluid in exhaust, the fluid can be condensed on a surface of the fluid conduit. In some examples, an outer surface of the fluid conduit may include a coating of one or more materials with a high heat capacity, or in certain examples, at least some portion of the fluid conduit is constructed from a material with a high heat capacity. The person of ordinary skill in the art, given the benefit of this disclosure, will be able to configure fluid conduits that provide fluid communication between a fuel source and a fuel cell and that are configured to condense fluid on one or more surfaces.

Figure 4:
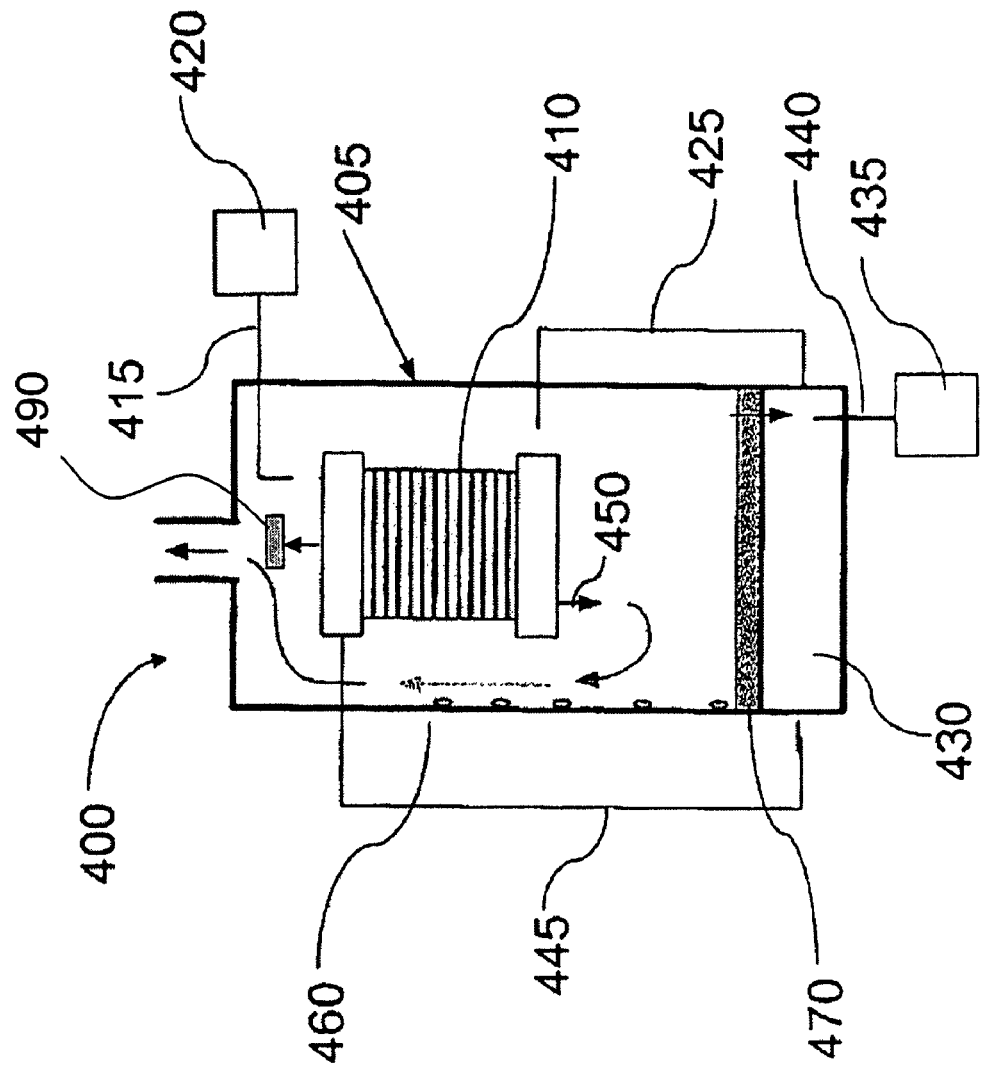
FIG. 4 is an example of a fuel cell assembly, in accordance with certain examples.

In accordance with certain examples, a fuel cell assembly is shown in FIG. 4. The fuel cell assembly 400 includes a fuel cell housing 405 and a fuel cell stack 410 in the fuel cell housing. In some examples, the fuel cell stack 410 is a fuel cell stack including a proton exchange membrane or is a direct methanol fuel cell stack. Fuel cells of the fuel cell stack 410 typically include a cathode, an anode, and an electrolyte between the cathode and the anode, and the fuel cell stack may include one or more separator plates. Air enters into the fuel cell stack 410 through a fluid conduit 415 from an air source 420. Fuel enters into the fuel cell stack 410 through a fluid conduit 425 from a fuel source 430. Fuel source 430 may be in fluid communication with an external fuel source tank, such as a fuel source tank 435 shown in fluid communication with the fuel source 430 through a fluid conduit 440, to replenish fuel that is consumed. The fuel cell stack 410 uses the air and fuel and produces exhaust air. Unused fuel can exit the fuel cell stack 410 and can be returned to the fuel source 430 through a fluid conduit 445. The path of the exhaust is shown schematically in FIG. 4 as arrow 450. As exhaust passes by a sidewall 460 of the fuel cell 410, the temperature of the sidewall 460 is lower than the vaporization temperature of fluid in the exhaust. For example, where fuel cell assembly 400 is a direct methanol fuel cell, the exhaust can include water vapor. If the temperature of the sidewall 460 is less than the vaporization temperature of water, then the water vapor will condense on the sidewall 460. In the example shown in FIG. 4, the fuel cell housing is configured such that the condensed fluid runs down the sidewall 460 and pools above the fuel source 430. Pooled condensate 470 can be fed back to the fuel source 430, e.g., through an opening in the fuel source 430 or through one or more pores or porous materials. In certain examples, the pooled condensate 470 can be stored in a fluid reservoir (not shown). The person of ordinary skill in the art, given the benefit of this disclosure, will be able to design suitable fuel cell assemblies incorporating the fuel cell housings disclosed herein. Unused fuel and carbon dioxide can also exit the fuel cell stack. In certain examples, the unused fuel and carbon dioxide can be passed through a reformer or a membrane 490 to remove the unused fuel from the exhaust. Substantially fuel free carbon dioxide can then be exhausted from the fuel cell housing. In examples, where the temperature of the sidewall 460 is below the vaporization temperature of the unused fuel, unused fuel may also condense along the sidewall 460.

Figure 5:
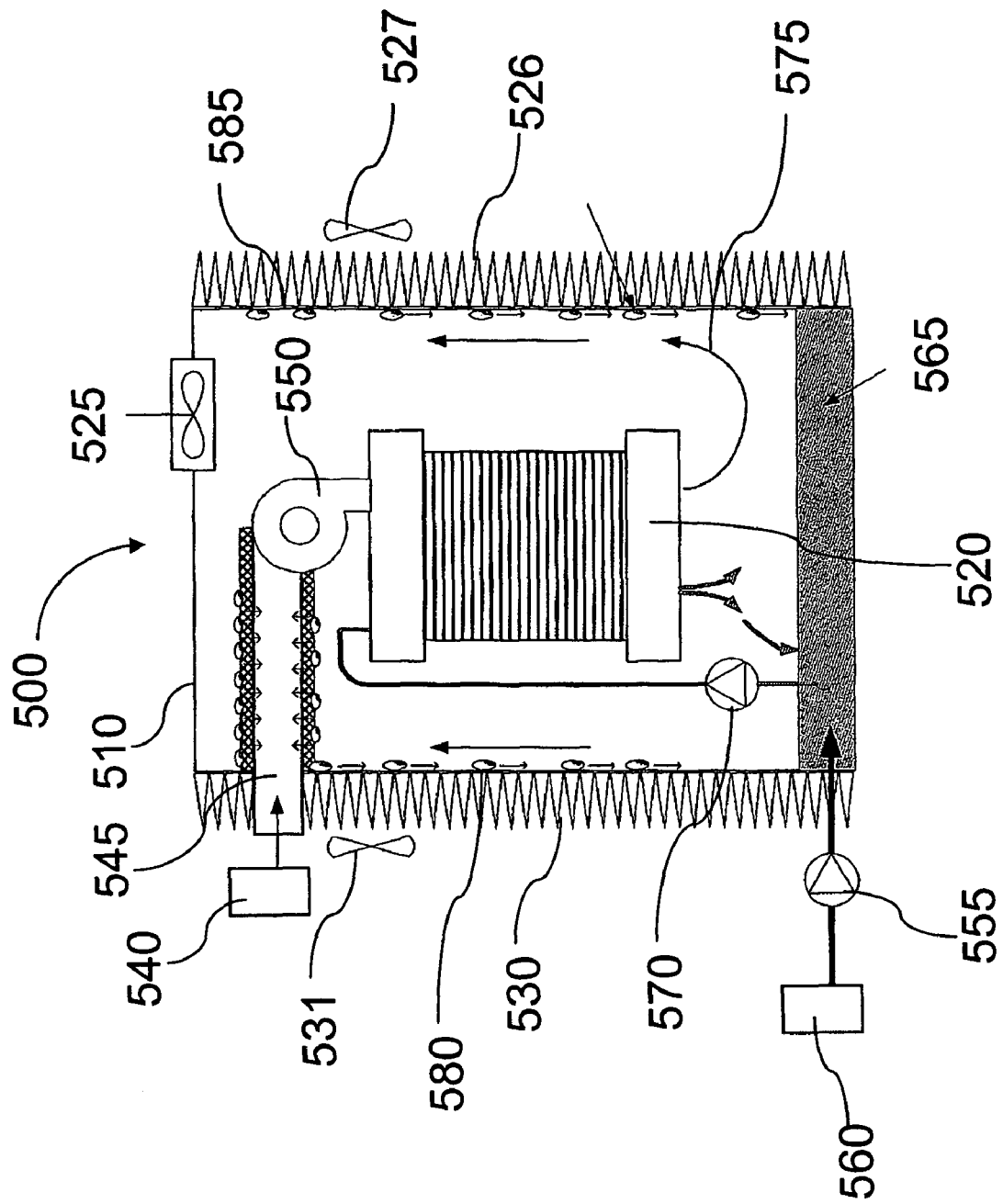
FIG. 5 is an additional example of a fuel cell assembly, in accordance with certain examples.
Figure 6B:
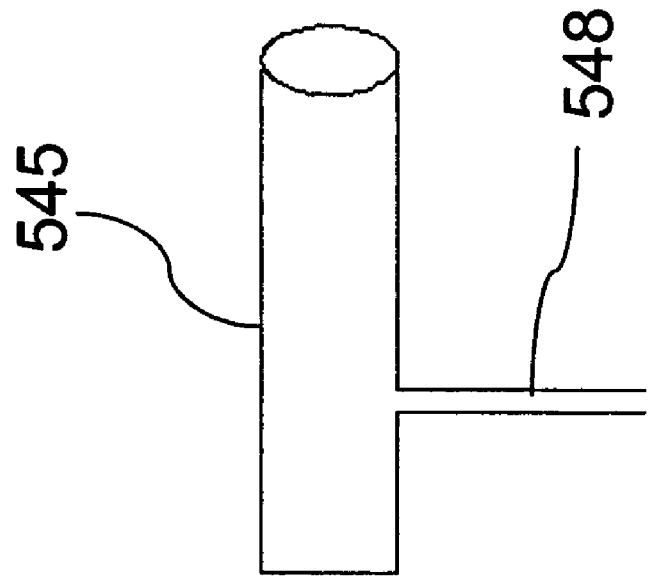
FIGS. 6A and 6B are several configurations suitable for returning condensed fluid to a fluid conduit.
Figure 6A:
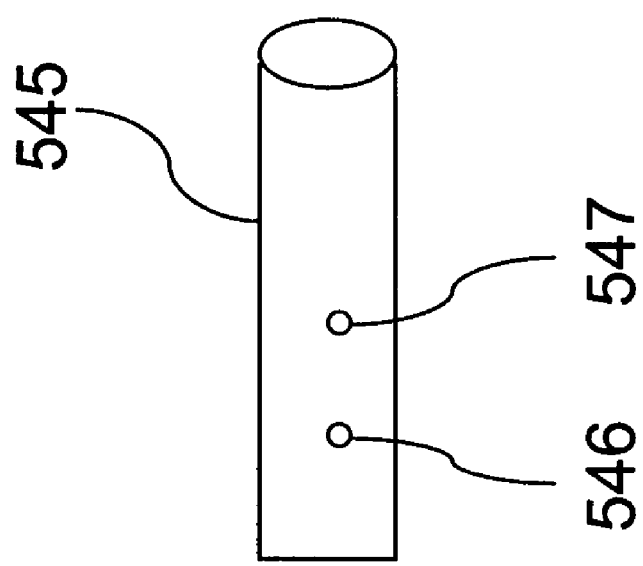

In accordance with certain examples, another fuel cell assembly is shown in FIG. 5. The fuel cell assembly 500 includes a fuel cell housing 510 with a fuel cell stack 520. In some examples, the fuel cell stack 520 is a fuel cell stack including a proton exchange membrane, e.g., a Nafion membrane, or is a direct methanol fuel cell stack. Each of the fuel cells of the fuel cell stack 520 typically include a cathode, an anode, and an electrolyte between the cathode and the anode, and the fuel cell stack may include one or more separator plates. Fuel cell housing 500 includes an exhaust fan 525 configured to exhaust air out of the fuel cell. Fuel cell housing 500 further includes fins 526 and cooling fan 527 configured to provide air to fins 526, and fins 530 and cooling fan 531 configured to provide air to fins 530. Air source 540 is in fluid communication with fuel cell stack 520 through the fluid conduit 545. In certain examples, fluid conduit 545 may include pores or weep holes to allow condensed fluid to enter into fluid conduit 545. For example and referring to FIG. 6A, the fluid conduit 545 can include pores 546 and 547 to allow condensation to enter into the fluid conduit 545. In other examples, the fluid conduit 545 is in fluid communication with a wick or additional fluid conduit, such as the fluid conduit 548, that is configured to provide condensed fluid to fluid conduit 545 (see FIG. 6B). In some examples, the other end of fluid conduit 548 is in fluid communication with a fluid reservoir. An air blower 550 provides air to the fuel cell stack 520 from the air source 540. A pump 555 provides fuel from a fuel source 560 to a fuel reservoir 565. In examples where the fuel cell stack is a direct methanol fuel cell, the fuel source 560 can be methanol and the fuel reservoir 565 typically contains about 1 M aqueous methanol. A pump 570 is configured to provide fuel from the fuel reservoir 565 to the fuel cell stack 520. During operation of fuel cell stack 520, exhaust 575 is outputted from the fuel cell stack 520. Exhaust air condenses along the sidewalls 580 and 585 and along a fluid conduit 545. The condensate drips to the bottom of the fuel cell housing 500 into the fuel reservoir 565. Unused fuel and carbon dioxide can also exit the fuel cell stack. In certain examples, the unused fuel and carbon dioxide can be passed through a reformer or a membrane to remove the unused fuel from the carbon dioxide. Carbon dioxide gas that is substantially free of fuel can then be exhausted from the fuel cell. In examples, where the temperature of the sidewalls 580 and 585 are below the vaporization temperature of the unused fuel, unused fuel may also condense along sidewalls 580 and 585 and the condensate can end up in fuel reservoir 565. Suitable membranes for removing fuel from the exhaust air include, but are not limited to, polymeric membranes, cellulose based membranes, membranes with bound or trapped metals to chelate excess fuel, hydrophobic membranes, etc.

In accordance with certain examples, a direct methanol fuel cell is provided. The direct methanol fuel cells includes a fuel cell housing and a direct methanol fuel cell stack in the fuel cell housing. The direct methanol fuel cell can use an aqueous solution of methanol as a fuel source and ambient air, e.g., atmospheric air, as the air source. The exact configuration of the fuel cell can vary, and in certain examples the fuel cells of the fuel cell stack include a cathode, an anode, and a proton exchange membrane between the cathode and the anode. During operation of the fuel cell, the fuel cell housing is configured to condense water from exhaust and return the water to the proton exchange membrane. In certain examples, the condensed water is returned to the proton exchange membrane through a fluid conduit that provides either fuel or air to the fuel cell. In certain other examples, the condensed water is returned to the proton exchange membrane through a wick or feeder tube in fluid communication with the proton exchange membrane. The wick or feeder tube may also be in fluid communication with a fluid reservoir to provide water to the proton exchange membrane through capillary action. It will be within the ability of the person of ordinary skill in the art, given the benefit of this disclosure, to design suitable direct methanol fuel cell assemblies using the fuel cell housing disclosed herein.

Although the fuel cell housing and fuel cell assemblies and methods of using them have been described above in terms of certain examples, various alterations, modifications, substitutions, additions and improvements will be readily apparent to the person of ordinary skill in the art, given the benefit of this disclosure. Such alterations, modifications, substitutions, additions and improvements are intended to be within the scope and spirit of the fuel cell housing and fuel cell assemblies disclosed here. It is also intended that the indefinite articles "a" and "an," as used above and in the appended claims, mean one or more of the articles which they modify, and that the terms "include," "including" and "having" are interchangeable with the open ended term "comprising."

What is claimed is:

1. A fuel cell assembly, comprising:
    a polymer electrolyte fuel cell within a condenser of the fuel cell assembly;
    a fuel cell housing defining the condenser and having an outlet and at least one surface configured to condense fluid from exhaust passing over or through the surface, the fuel cell housing configured to return condensed fluid to an electrolyte of the polymer electrolyte fuel cell within the fuel cell housing;
    an exhaust flow path configured to receive the exhaust from the polymer electrolyte fuel cell; and
    a device configured to selectively route a first portion of the exhaust to the outlet and a second portion of the exhaust to the at least one surface of the fuel cell housing to provide a desired level of fluid condensation in the fuel cell housing.

2. The fuel cell assembly of claim 1 further comprising fins disposed on the surface of the fuel cell housing.

3. The fuel cell assembly of claim 1 further comprising a pump configured to return the condensed fluid to the electrolyte of the fuel cell.

4. The fuel cell assembly of claim 1 further comprising a wick configured to return the condensed fluid to the electrolyte of the fuel cell.

5. The fuel cell assembly of claim 1 in which the fuel cell housing is configured to return the condensed fluid to the fuel cell through a fluid conduit that provides fluid communication between a fuel source and the fuel cell.

6. The fuel cell assembly of claim 1 in which the fuel cell housing is configured to return the condensed fluid to the fuel cell through a fluid conduit that provides fluid communication between an air source and the fuel cell.

7. The fuel cell assembly of claim 1 further comprising a fluid reservoir configured to receive the condensed fluid.

8. The fuel cell assembly of claim 1 further comprising an exhaust manifold configured to receive the exhaust and to condense the fluid from the exhaust.

9. The fuel cell assembly of claim 1 in which the fluid from the exhaust to be condensed has a vaporization temperature and in which at least one surface is configured to have a temperature less than the vaporization temperature of the fluid to be condensed.

10. The fuel cell assembly of claim 1 further comprising a plurality of surfaces each configured to condense the fluid from the exhaust.

11. The fuel cell assembly of claim 1 in which the at least one surface is in thermal communication with a cooling device.

12. The fuel cell assembly of claim 11 in which the cooling device is a heat sink, a fan, a blower, a device comprising at least one high heat capacity material, and combinations thereof.

13. The fuel cell assembly of claim 1 further comprising a membrane configured to remove unused fuel from the exhaust.

14. The fuel cell assembly of claim 13 in which the membrane is selected from the group consisting of polymeric membranes, cellulose based membranes, membranes with bound or trapped metals to chelate excess fuel, and hydrophobic membranes.

15. The fuel cell assembly of claim 1, wherein the at least one surface comprises a sidewall of the housing, and wherein the housing is configured such that the condensed fluid runs down the sidewall of the housing to a bottom of the housing.

16. The fuel cell assembly of claim 15, wherein the housing is configured such that the condensed fluid pools above a fuel source.

17. The fuel cell of claim 1, wherein the at least one surface has a higher heat capacity or a higher heat transfer coefficient relative to a remainder of the fuel cell housing.

18. The fuel cell assembly of claim 1, wherein the fuel cell assembly does not include a pump to return the condensed fluid to the electrolyte.

19. The fuel cell assembly of claim 1, wherein the device comprises at least one controllable valve at the fuel cell housing outlet.

20. The fuel cell assembly of claim 1, wherein the device comprises a fan configured to control retention of the exhaust within the fuel cell housing based on a speed of the fan.

21. A fuel cell assembly comprising:
a condenser consisting essentially of a fuel cell housing configured to provide a surface for condensation of fluid in exhaust;
at least one polymer electrolyte fuel cell comprising an anode, a cathode, and an electrolyte between the anode and the cathode, wherein the fuel cell housing is configured to return condensed fluid to the electrolyte of the at least one polymer electrolyte fuel cell;
an exhaust flow path configured to direct the exhaust from the at least one polymer electrolyte fuel cell; and
a device configured to selectively route a first portion of the exhaust to an outlet of the fuel cell assembly and a second portion of the exhaust to the condenser to achieve a desired level of fluid condensation;
wherein the at least one polymer electrolyte fuel cell is positioned within the condenser.

22. The fuel cell assembly of claim 21 wherein the at least one fuel cell is a fuel cell in a fuel cell stack.

23. The fuel cell assembly of claim 21 further comprising a fuel source in fluid communication with the anode and an air source in fluid communication with the cathode.

24. The fuel cell assembly of claim 23 in which the fuel source is in the fuel cell housing.

25. The fuel cell assembly of claim 23 in which the fuel source is an aqueous methanol solution and the air source is ambient air.

26. A method of providing a substantially constant electrolyte fluid level in a polymer electrolyte fuel cell, the method comprising:
positioning the polymer electrolyte fuel cell within a condenser of a fuel cell assembly;
determining a portion of exhaust to retain for condensation based on the substantially constant electrolyte fluid level to be provided;
directing the portion of the exhaust from the polymer electrolyte fuel cell along a fluid flow path within the condenser;
releasing an excess of the exhaust at an outlet;
condensing fluid from the exhaust air along the fluid flow path; and
returning condensed fluid to electrolyte of the polymer electrolyte fuel cell to maintain the substantially constant electrolyte fluid level during operation of the polymer electrolyte fuel cell.

27. The method of claim 26 further comprising passing the exhaust over at least one surface of the fuel cell housing to condense the fluid from the exhaust.

28. The method of claim 26 further comprising routing the exhaust through an exhaust manifold to condense the fluid from the exhaust.

29. The method of claim 26 further comprising storing the condensed fluid in a fluid reservoir within the fuel cell housing.

30. The method of claim 26 further comprising passing the exhaust through a membrane to remove unused fuel from the exhaust.

31. The method of claim 26, further comprising collecting the condensed fluid at a bottom of the fuel cell housing.

* * * * *

UNITED STATES PATENT AND TRADEMARK OFFICE
CERTIFICATE OF CORRECTION

| | | |
|---|---|---|
| PATENT NO. | : 7,955,742 B2 | Page 1 of 1 |
| APPLICATION NO. | : 10/900989 | |
| DATED | : June 7, 2011 | |
| INVENTOR(S) | : Nielsen et al. | |

It is certified that error appears in the above-identified patent and that said Letters Patent is hereby corrected as shown below:

In claim 17, column 9, line 50, "fuel cell" should be replaced with --fuel cell assembly--.

In claim 26, column 10, line 40, "air" should be deleted.

Signed and Sealed this
Thirteenth Day of September, 2011

David J. Kappos
*Director of the United States Patent and Trademark Office*